(12) United States Patent
Barron et al.

(10) Patent No.: US 9,354,821 B2
(45) Date of Patent: May 31, 2016

(54) BRIDGING STORAGE CONTROLLERS IN CLUSTERED DEPLOYMENTS

(71) Applicant: NetApp, Inc., Sunnyvale, CA (US)

(72) Inventors: Edward Barron, Pepperell, MA (US); Amarnath Jolad, Bangalore (IN); Bhaskar Singhal, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 41 days.

(21) Appl. No.: 14/282,911

(22) Filed: May 20, 2014

(65) Prior Publication Data

US 2015/0339080 A1 Nov. 26, 2015

(51) Int. Cl.
*G06F 13/12* (2006.01)
*G06F 13/38* (2006.01)
*G06F 3/06* (2006.01)
*G06F 13/42* (2006.01)

(52) U.S. Cl.
CPC .............. *G06F 3/0655* (2013.01); *G06F 3/06* (2013.01); *G06F 3/067* (2013.01); *G06F 3/0608* (2013.01); *G06F 13/42* (2013.01); *G06F 13/4221* (2013.01)

(58) Field of Classification Search
None
See application file for complete search history.

(56) References Cited

U.S. PATENT DOCUMENTS

| | | | | |
|---|---|---|---|---|
| 2007/0121633 A1* | 5/2007 | Moretti | ................. | G06F 13/385 370/392 |
| 2007/0156879 A1* | 7/2007 | Klein | .................. | H04L 41/5019 709/223 |
| 2013/0268545 A1* | 10/2013 | Burchett | ........... | G06F 17/30569 707/754 |

* cited by examiner

*Primary Examiner* — Elias Mamo
(74) *Attorney, Agent, or Firm* — Cooper Legal Group, LLC

(57) ABSTRACT

A storage controller receives data from a host. The data is provided to a storage stack on the storage controller. The storage stack can perform deduplication, compression or file layout operations on the data, which is then written to a first storage unit coupled to a first port of the storage controller. The storage controller determines whether a second port of the first storage controller is configured as a remote port. In response to determining that the second port is configured as a remote port, the data is also provided to a pass-thru stack on the first storage controller. The pass-thru stack performs protocol conversion on the data and writes the data to the second port on the storage controller.

20 Claims, 8 Drawing Sheets

BRIDGING STORAGE CONTROLLERS IN CLUSTERED DEPLOYMENTS

BACKGROUND

Aspects of the disclosure generally relate to the field of computer storage systems, and, more particularly, to integrating bridge functions with storage controllers.

A network storage controller is a processing system that is used to store and retrieve data on behalf of one or more hosts on a network. A storage controller operates on behalf of one or more hosts to store and manage data in a set of mass storage devices, such as magnetic or optical storage-based disks or tapes. Some storage controllers are designed to service file-level requests from hosts, as is commonly the case with file servers used in network attached storage (NAS) environments. Other storage controllers are designed to service extent-level requests from hosts, as with storage controllers used in a storage area network (SAN) environment. Still other storage controllers are capable of servicing both file-level requests and extent-level requests, as is the case with certain storage controllers made by NetApp, Inc. of Santa Clara, Calif.

Storage controllers can be configured to provide high availability and disaster recovery capabilities. In such configurations, two or more storage controllers, typically located at different sites, are used to replicate data. Data received from a host by a first controller can be written to storage local to the first storage controller. In addition, the first storage controller can forward the data to a second storage controller, which stores a copy of the data on storage local to the second controller. In the event of a failure or other problem with storage attached to the first controller, replicated data can be retrieved from storage local to the second controller.

While such configurations can provide high availability and disaster recovery, the cost of such systems can be high due to the hardware and software components used to implement such configurations.

SUMMARY

Features of systems, methods and computer-readable storage media of the disclosure include a storage controller receiving data from a host. The data is provided to a storage stack on the storage controller. The storage stack can perform deduplication, compression or file layout operations on the data, which is then written to a first storage unit coupled to a first port of the storage controller. The storage controller determines whether a second port of the first storage controller is configured as a remote port. In response to determining that the second port is configured as a remote port, the data is also provided to a pass-thru stack on the first storage controller. The pass-thru stack performs protocol conversion on the data and writes the data to the second port on the storage controller.

BRIEF DESCRIPTION OF THE DRAWINGS

The disclosure may be better understood, and numerous objects, features, and advantages made apparent to those skilled in the art by referencing the accompanying drawings.

DETAILED DESCRIPTION OF EXAMPLE ILLUSTRATIONS

The description that follows includes exemplary systems, methods, techniques, instruction sequences and computer program products that embody techniques of the inventive subject matter. However, it is understood that the described aspects of the disclosure may be practiced without these specific details. For instance, although examples refer to bridging a storage controller with another storage controller or with cloud storage through a fibre channel switch, other communications mechanisms may be used. For example, FCoE (fibre channel over Ethernet) or ISCSI (Internet Small Computer System Interface) protocols may be used in conjunction with a communications media supporting Ethernet or Internet protocols. In other instances, well-known instruction instances, protocols, structures and techniques have not been shown in detail in order not to obfuscate the description.

Aspects of the disclosed subject matter relate to providing a software bridge between a first storage controller and a second storage controller or other storage subsystem, such as cloud based storage. The bridge functionality provided in the storage controllers may be used in some implementations to automatically provide for a redundant copy of data to be used, for example in disaster recovery, in the case of a failure of a storage unit. A storage controller provides multiple ports that can be used to write data received from an application or operating system on a host (referred to herein as host application and host operating system) requesting the write. Data received from the host application can be written to a first port through a first stack, where various value-added operations such as compression, data deduplication, file layout and other operations can be performed. In addition, the data can be written to a second port through a second stack, where protocol conversion can be performed, but value-added operations are not performed.

Figure 1:
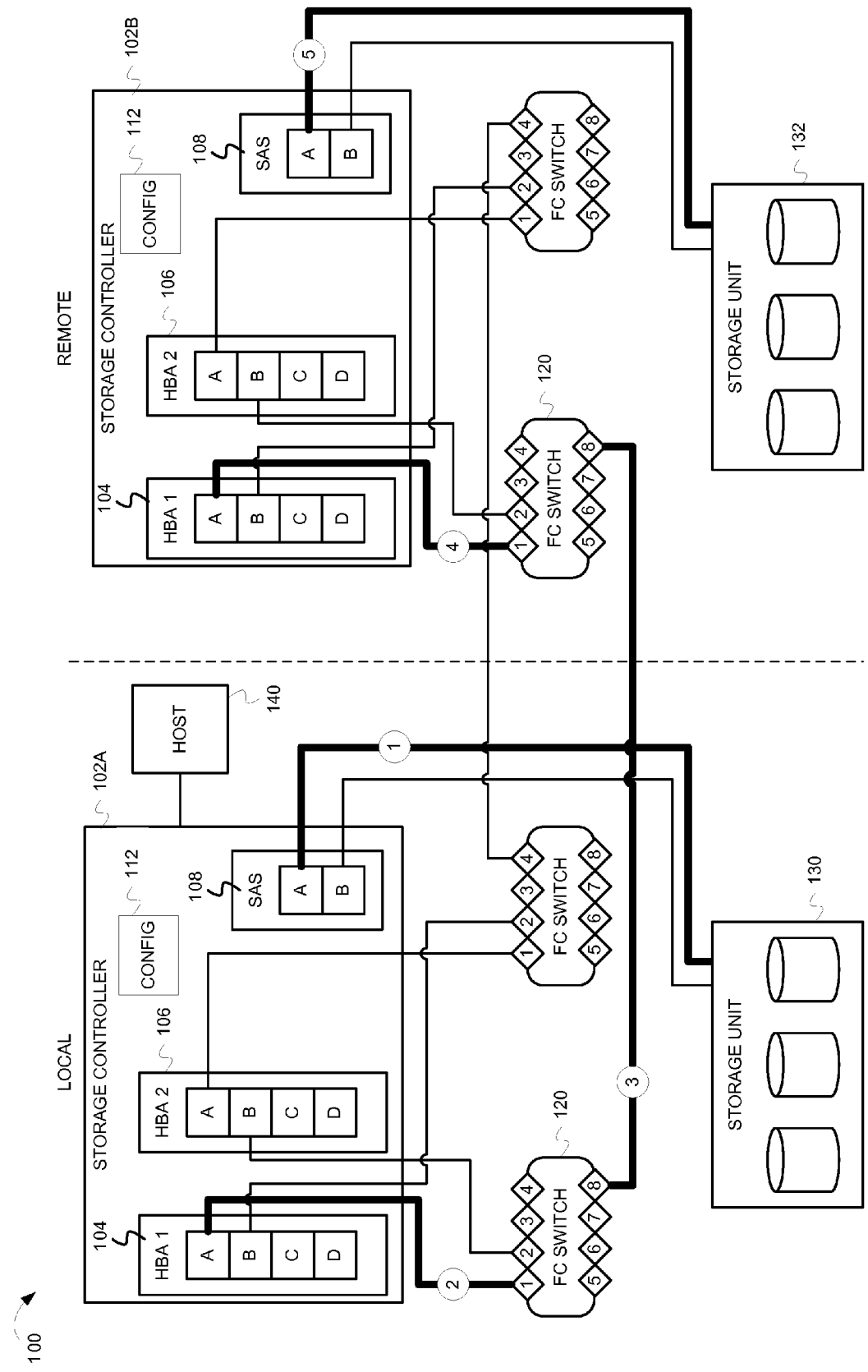
FIG. 1 illustrates an example system for bridging storage controllers.

FIG. 1 illustrates a system 100 for bridging storage controllers. System 100 includes storage controllers 102A and 102B (generically referred to as a storage controller 102), fibre channel switches 120 and storage units 130 and 132. Storage units 130 and 132 can include one or more mass storage devices for storing data. The mass storage devices can be configured to operate in different configurations, such as different RAID configurations. The mass storage devices may be, for example, conventional magnetic disks, optical disks such as CD-ROM or DVD based storage, magneto-optical (MO) storage, flash memory storage device or any other type of non-volatile storage devices suitable for storing data. A mass storage device may also be referred to as a "disk." Although two storage controllers are illustrated in FIG. 1, a system may have more than two storage controllers.

Storage controller 102 provides an interface to hosts (e.g., host 140) allowing applications and operating systems executing on host 140 to read and write data from/to storage unit 130. Features of storage controller 102 can include HBA (host bus adapter) 104 and 106. HBA 104 and HBA 106 provide an interface from the storage controller to devices using protocols supported by the HBA. HBA 104 and HBA 106 can support a fibre channel protocol. Alternatively, HBA 104 and HBA 106 can support a SCSI (Small Computer System Interconnect) protocol. In the example illustrated in FIG. 1, storage controller 102 includes both HBA 104 and HBA 106. Inclusion of two HBAs in a storage controller 102 can be desirable to increase reliability of the controller by eliminating single points of failure. However, a storage controller may have a single HBA or more than two HBAs.

Storage controller 102 can also include an SAS (Serial Attached SCSI) adapter 108. SAS adapter 108 provides an interface to devices supporting the SAS protocol. Storage units 130 and 132 can provide an SAS interface and storage controller 102 can be coupled to storage unit 130 or storage unit 132 through SAS adapter 108. In the example illustrated in FIG. 1, SAS adapter 108 includes two ports labeled "A" and "B." An SAS adapter may have more than two ports. Further, a storage controller may have more than one SAS adapter.

Fibre channel switches 120 provide a fibre channel switching fabric. A feature of some storage controllers 102 is that fibre channel switches 120 are used to provide a data connection between two storage controllers (e.g., local storage controller 102A and remote storage controller 102B). As used herein, "local" and "remote" are from the point of view of a host 140. Access to storage devices coupled to storage controller 102B caused by read or writes initiated on host 140 pass through fibre channel switches 120 to storage controller 102B. Thus storage controller 102A is local to host 104, while storage controller 102B is remote from host 140. Fibre channel switches 120 may be coupled through long haul networks, allowing communications between controllers located up to 140 kilometers apart.

A feature of storage controller 102A includes implementation of a software bridge to storage controller 102B. Similarly, storage controller 102B can implement a software bridge to storage controller 102A. An example data flow will now be provided to illustrate bridging functionality provided by software controller 102A. Assume that data storage unit 132 provides redundant copies of some or all of the data on stored on data storage unit 130. For example, data storage unit 132 may be used to access data in the event of a failure in storage unit 130, or in the event that disaster recovery operations are to be performed. In this example, data for files on storage unit 130 are copied to storage unit 132. Continuing with the example, assume that an application on host 140 writes data to a file on storage unit 130. The data can be written to storage unit 130 via path 1 using an SAS connection between the SAS adapter 108 on the storage controller 102A and storage unit 130.

In addition, the data for the file is written via path 2 using a connection from port A of HBA 104 to port 1 of local fibre channel switch 120. The data for the file are then transmitted across the fibre channel fabric via path 3 using a connection from port 8 of local fibre channel switch 120 to port 8 of remote fiber channel switch 120. The data for the file are provided via path 4 using a connection from port 1 of remote fibre channel switch 120 to port A of HBA 104 on storage controller 102B. Storage controller 102B causes the data to be written to storage unit 132 via path 5, which can be a connection from port A of SAS adapter 108 of storage controller 102B to storage unit 132. The ports identified for HBAs 104, fibre channel switches 120 and SAS adapters 108 are for an example configuration of system 100. Other configurations may use different ports and are within the scope of the inventive subject matter.

Other protocol conversions can be included as part of the bridging functions performed by a storage controller 102. For instance, in the example implementation illustrated in FIG. 1, SAS adapter 108 may use a different block size (e.g., 520 byte blocks) from the block size used by HBA 104 to write data using a fibre channel interface (e.g., 512 byte blocks). Storage controller 102 may implement a block size conversion function as part of the software bridge provided by storage controller 102.

Various configuration options may also be present on a storage controller 102. Configuration data 112 may specify various options associated with bridging functions provided by storage controller 102. For example, a port on HBA 104 may be designated as a local port or a remote port. Further, a disk on a storage unit 130 or storage unit 132 may designated as a local disk or a foreign disk. In the context of this disclosure, a foreign disk can be a disk on a storage unit coupled to a remote storage controller 102 that provides a redundant copy of data stored on disk (e.g., a local disk) of a storage unit coupled to a local storage controller.

Figure 2:
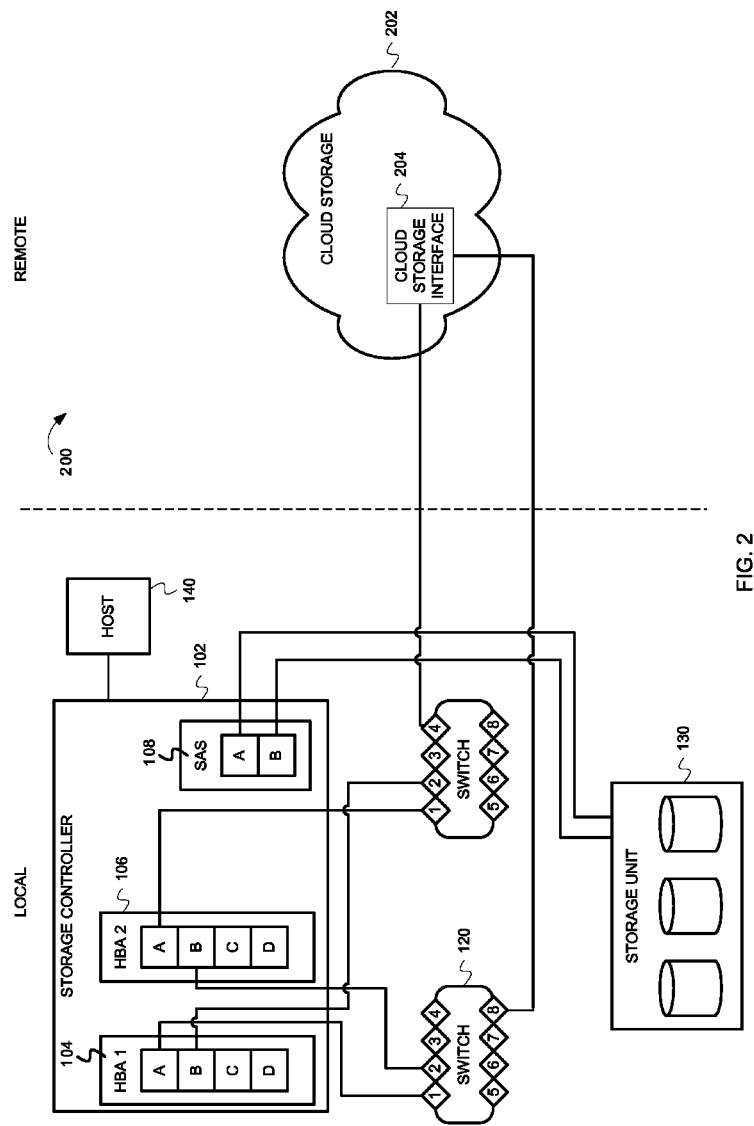
FIG. 2 illustrates a system for bridging a storage controller to a cloud.

FIG. 2 illustrates a system 200 for bridging a storage controller 102 with a cloud storage system 202. In some aspects of the disclosure, cloud storage system 202 provides cloud storage for system 200. For example, cloud storage system 202 may be the Amazon S3 cloud storage system, a Rackspace cloud storage system, or other cloud storage system now known or developed in the future. Cloud storage interface 204 provides an interface for external systems to provide data to the cloud storage system 202. Cloud storage interface 204 may implement a data transfer protocol. For example, the Amazon S3 cloud storage system implements a web services based data transfer protocol. In some implementations, cloud storage system 204 can provide data redundancy for data written by applications on host 140. Thus cloud storage system 202 can provide high reliability, fault tolerance, and disaster recovery capability for system 200. Data written to storage unit 130 by an application on host 140 can be copied to cloud storage system 202 using bridging capability implemented on storage controller 102. Storage controller 102 can implement conversion functions to convert between data formats supported by storage unit 130 (e.g., SAS) to data formats supported by cloud storage interface 204 (e.g., web services).

Figure 3:
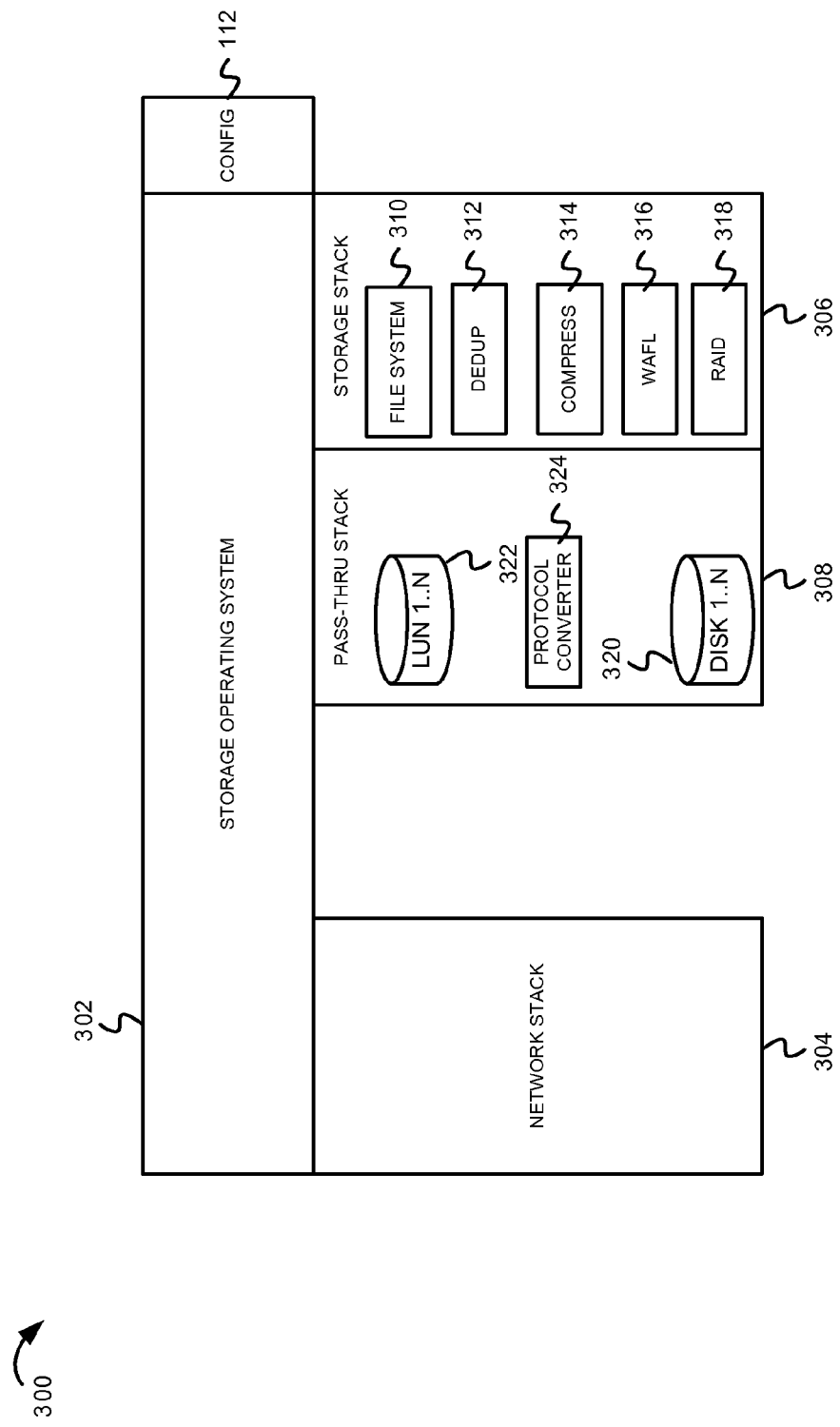
FIG. 3 illustrates aspects of a software operating environment for a storage controller.

FIG. 3 illustrates a software operating environment 300 for a storage controller disclosed herein. In some aspects of the disclosure, the software operating environment includes storage operating system 302, network stack 304, storage stack 306, and pass-thru stack 308. Storage operating system 302 controls the operations of a storage controller 102. For example, storage operating system 302 can direct the flow of data through the various interfaces and stacks provided by the hardware and software of a storage controller. As an example, storage operating system 302 can be a version of the Data ONTAP® storage operating system included in storage controller products available from NETAPP®, Inc. ("NETAPP") of Sunnyvale, Calif.

Network stack 304 provides an interface for communication via a network. For example, network stack 304 can be a TCP/IP, UDP/IP protocol stack. Other network stacks may be used and are within the scope of the inventive subject matter.

Storage stack 306 provides an interface to and from a storage unit 130. Storage stack may include various drivers and software components used to provide both basic communication capability with a storage unit and provide various value-added components such as file systems layer 310, data deduplication layer 312, data compression layer 314, write anywhere file layout (WAFL) layer 316, RAID layer 318, and other enhanced storage functions. The components may be arranged as layers in the storage stack 306 or they may be independent of a layered architecture.

File systems layer 310 can be a file system protocol layer that provides multi-protocol file access. Examples of such file system protocols include the Direct Access File System (DAFS) protocol, the Network File System (NFS) protocol, and the CIFS protocol.

Data deduplication layer 312 can be used to provide for more efficient data storage by eliminating multiple instances of the same data stored on storage units. Data blocks that are duplicated between files are rearranged within the storage units such that one copy of the data occupies physical storage. References to the single copy can be inserted into the file system structure such that all files or containers that contain the data refer to the same instance of the data.

Data compression layer 314 provides data compression services for the storage controller. File data may be compressed according to policies established for the storage controller using any lossless data compression technique.

WAFL layer 316 stores data in an on-disk format representation that is block-based using, e.g., 4 kilobyte (KB) blocks and using a data structure such as index nodes ("Modes") to identify files and file attributes (such as creation time, access permissions, size and block location). In WAFL architectures, modified data for a file may be written to any available location, as contrasted to write-in-place architectures in which modified data is written to the original location of the data, thereby overwriting the previous data.

RAID (Redundant Array of Independent Disks) layer 318 can be used to distribute file data across multiple storage units to provide data redundancy, error prevention and correction, and increased storage performance. Various RAID architectures can be used as indicated by a RAID level.

Pass-thru stack 308 provides a basic stack for communicating with a storage unit. The storage controller can be configured to provide a minimal level of intervention such that data can pass through the stack more rapidly than through storage stack 306. For example, pass-thru stack 308 may omit any or all of compression, deduplication, WAFL or RAID processing layers. Pass-thru stack 308 can provide a mapping from logical units (LUNs) 322 to disks 320. The mapping may be a one-to-one mapping. That is, a single LUN is mapped to a single disk. However, other mappings are possible. The mappings from a LUN to a disk may be established in response to a storage controller determining that a disk in a storage unit has been designated as a foreign disk or a port on a HBA being designated as a remote port. Such designations may be maintained in configuration data 112.

In addition, pass-thru stack 308 may provide a protocol converter 324. Protocol converter 324 may receive data via a port configured for a first protocol and provide the data to a port using a second protocol. For example, data may be received by pass-thru stack in a fibre channel protocol having a 512 byte block size and converted to an SAS protocol having a 520 byte block size. Other protocol conversion functions may be implemented in protocol converter 324. For example, protocol converter 324 may convert between various combinations of protocols including SAS, Fibre Channel, Fibre Channel over Ethernet (FCoE), ISCSI, etc.

In some configurations, storage operating system 302 may expect a LUN to be associated with particular storage constructs. For example, storage operating system 302 may expect a LUN to be associated with a volume or aggregation structure. In such cases, virtual volumes and aggregations may be created and associated with LUNs that are implemented by pass-thru stack 308.

Figure 4:
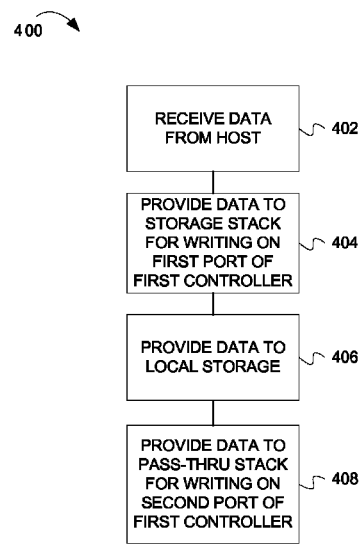
FIG. 4 is a flowchart illustrating a method for providing bridging functions in a storage controller.

FIG. 4 is a flowchart 400 of example operations for providing a bridging function in a storage controller. At block 402 a first storage controller receives data to be written to a first storage unit. For example, the data may be received by a first storage controller 102A from an application or operating system running on a host computer 140 (FIG. 1).

At block 404, the first storage controller provides the data to a storage stack on the first storage controller. The data is passed through the storage stack and various value-added operations may be performed using the data. For example, deduplication operations may be performed on the data to reduce the amount of file storage required by the data. Further, the data may be compressed using lossless compression algorithms designed to reduce the amount of disk storage required by the data. Still further, operations to write the data in a WAFL may be performed. In addition, the data may be formatted for use in a RAID configuration of disks.

At block 406, the data processed by the storage stack on the first storage controller can be written to the local storage. For example, the data may be written from a port on an SAS adapter 108 to an SAS storage unit 130 (FIG. 1).

At block 408, the data received from host 140 is also provided to a second stack on the first storage controller. The second stack may be associated with a second adapter on the first storage controller. For example, the second adapter may be an HBA (e.g., HBA 104, FIG. 1) that is configured as a fibre channel port. The second stack can implement a different protocol than the storage stack. For example, the storage stack may implement an SAS protocol, while the second stack may implement a fibre channel protocol. Thus various conversions may be performed prior to providing the data to the second adapter. For example, the block sizes used by SAS and fibre channel can be different depending on implementations. In some implementations, disks attached to an SAS adapter may be formatted for 520 byte block sizes while fibre channel or SCSI disks may, in some cases, be formatted for 512 byte blocks. A storage operating system may include a protocol converter that converts 520 byte blocks to 512 byte blocks and vice versa.

The second stack provides the data (after any conversion or reformatting) to the second adapter. The second adapter then provides that data to a second storage controller. As an example, the second adapter may provide the data to a switch fabric such as a fibre channel switch fabric. Alternatively, the data may be provided to cloud based storage system.

Figure 5:
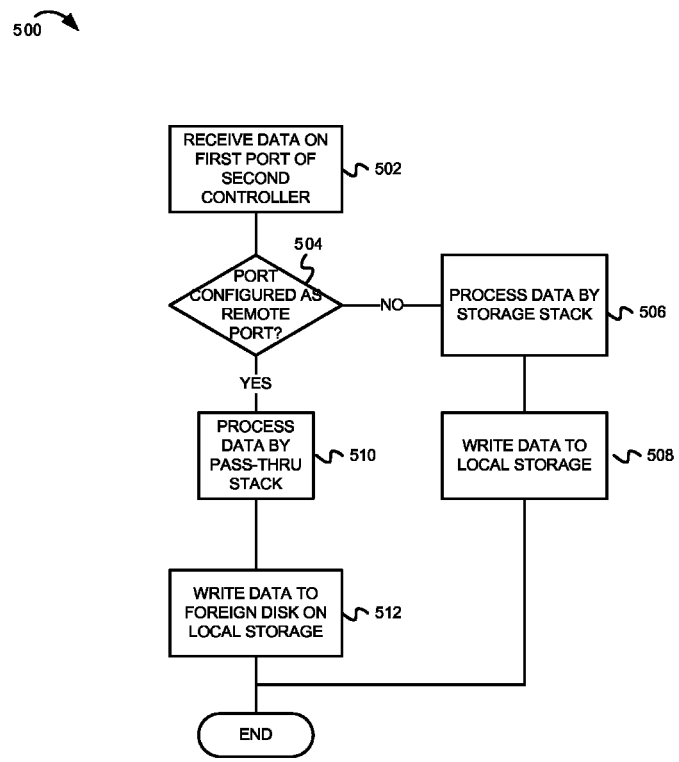
FIG. 5 is a flowchart illustrating a method for bridging storage controllers.

FIG. 5 is a flow chart 500 of example operations for bridging storage controllers. The example operations illustrated in FIG. 5 may be implemented on a second storage controller (e.g., storage controller 102B, FIG. 1) that is communicably coupled to a first storage controller (e.g., storage controller 102A, FIG. 1), for example, through a fibre channel switch. The example operations illustrated in FIG. 5 may be performed in conjunction with the example operations performed in FIG. 4 in implementations where two storage controllers are communicably coupled to one another.

At block 502, a second storage controller receives data via a first port. As an example, the data may be received on an HBA port of the second controller.

At block 504, a storage operating system determines if the first port of the second controller is configured as a remote port. In some implementations, a port may be configured as a remote port when the port is intended to send and receive data for a disk that has been configured as a foreign (i.e., remote) disk.

If the check at block 504 determines that the first port is not configured as a remote port, then at block 506, the data received on the first port of the second controller is sent to a storage stack (e.g., storage stack 306, FIG. 3) for processing. The storage stack may include layers or components that compress the data, deduplicate the data, arrange for the data to be located within a file on a file system, and write the data using RAID and/or WAFL techniques. The data is written at block 508 by a second port on the second controller such as an SAS port. The data is written to one or more disks configured as local disks of a local storage unit.

Alternatively, if the check at block 504 determines that the first port of the second controller is configured as a remote port, then at block 510, the data received on the first port is provided to a pass-thru stack. The pass-thru stack omits much of the processing performed by a storage stack. In some implementations, a pass-thru stack 308 omits RAID and WAFL processing. After processing by the pass-thru stack, the data is written to a disk configured as a foreign disk of a local storage unit coupled to the second controller (block 512). For example, the data may be written by an SAS port of the second controller.

It should be noted that the operations illustrated in FIGS. 4 and 5 need not be performed in the exact order provided in the figures. Further, some or all of the operations may be performed in parallel with one another. For example, operations at blocks 404 and 406 may be performed in parallel with some or all of the operations performed at blocks 502-512.

Figure 6:
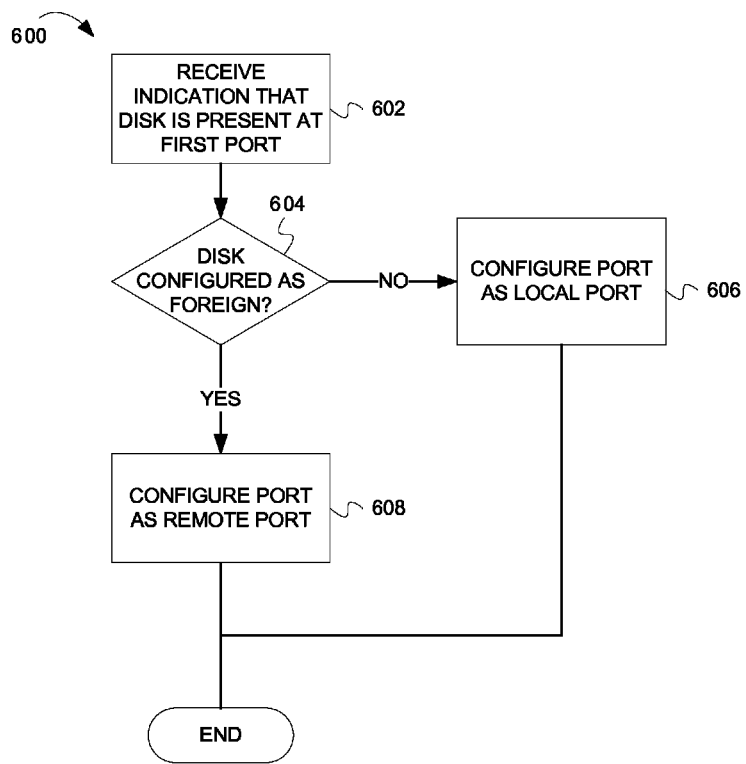
FIG. 6 is a flowchart illustrating a method for configuring a port on a local storage controller.

FIG. 6 is a flow chart illustrating a method 600 for configuring a port on a remote storage controller. Method 600 begins at block 602 with receiving an indication that a disk is present on a port. An indication that a disk is present on a port may be determined during a device discovery operation or as part of a plug and play operation on a storage controller. As an example, a disk may be determined to be present on an SAS port of a remote storage controller (e.g., storage controller 102B).

At decision block 604, a check is made to determine if the disk has been configured to be a foreign disk. A foreign disk is a disk that is dedicated for use by a storage controller that is different from (i.e., remote from) the storage controller incorporating the adapter to which the disk is coupled. For example, a disk on in storage unit 132 may be designated as foreign, and thus dedicated for use by storage controller 102A (or other storage controller other than the storage controller 102B). A disk may be configured as foreign by a system administrator or other user via a graphical user interface or command line interface used to provide configuration parameters for a storage controller.

If the check at block 604 determines that the disk is not a foreign disk, then at block 606, the port coupled to the disk is configured as a local port. Configuring a port as a local port causes data received for writing through the port to be provided to a storage stack, where one or more value-added operations such as the compression, deduplication, WAFL operations or other operations may be performed prior to writing the data to a disk or storage unit coupled to the port.

If the check at block 604 determines that the disk is a foreign disk, then at 608, the port coupled to the disk is configured as a remote port. Configuring a port as a remote port causes data received for writing through the port to be provided to a pass-thru stack. The pass-thru stack can perform protocol conversion, but does not perform any value-added operations such as compression, deduplication, WAFL operations etc.

Figure 7:
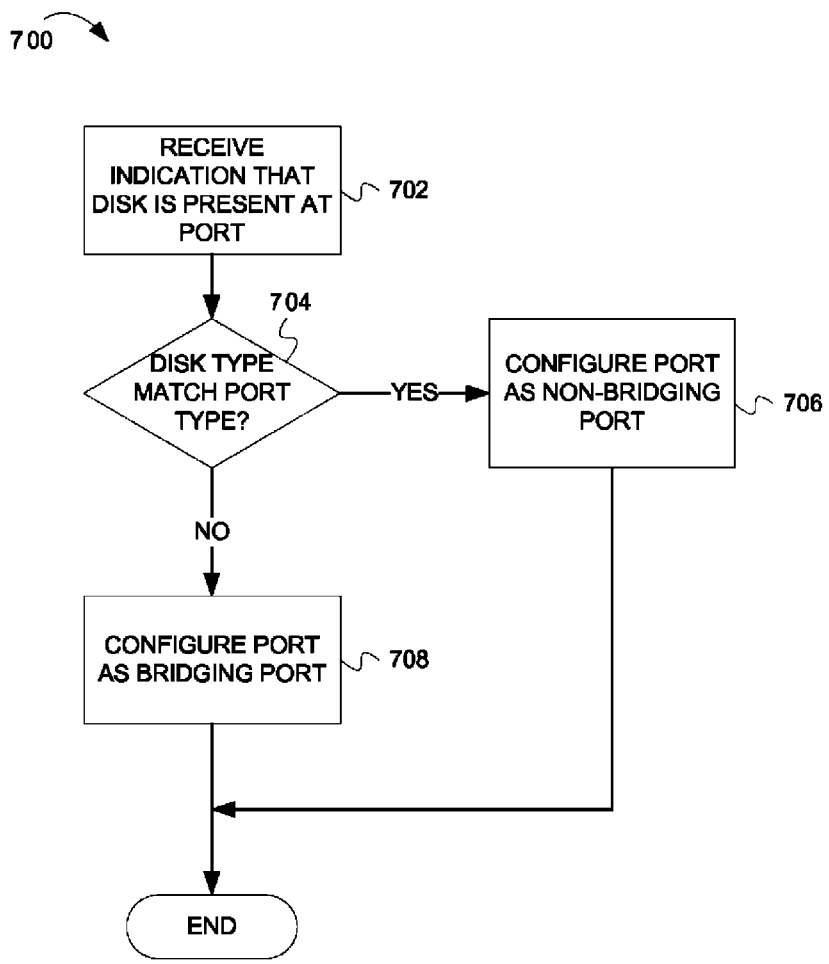
FIG. 7 is a flowchart illustrating a method for configuring a port on a remote storage controller.

FIG. 7 is a flow chart illustrating a method 700 for configuring a port on a local storage controller. Method 700 begins at block 702 by receiving an indication that a disk is present on a port. Like block 602 above, an indication that a disk is present may be determined during a discovery operation or a plug and play operation on the storage controller. As an example, a local storage controller (e.g., storage controller 102A) may determine that a disk on a remote storage controller is available for use by the local storage controller (e.g., storage controller 102B) via HBA adapter 104 on the local storage controller.

At decision block 704, a check is made to determine if the disk type matches the port type. According to some features of the disclosure, header information may be received from a disk during a discovery operation or plug and play operation. The header information may identify the disk protocol for the disk. For example, disks in storage unit 132 that are coupled to SAS port 108 on storage controller 102B may include information in the disk header that identifies the disk as an SAS type disk. However, as shown in FIG. 1, the disk may be presented to local storage controller 102A through a fibre channel port. Thus the disk type (SAS) in this example does not match the port type (fibre channel).

If the check at block 704 determines that the disk type matches the port type, then at block 706 the port is configured as a non-bridging port on the local storage controller. As an example, if a fibre channel disk is coupled to a fibre channel port on the storage controller, then the port is configured as a non-bridging port. A port configured as a non-bridging port causes data to be written via the port to be provided to a storage stack having value-added components such as compression, deduplication, WAFL etc.

If the check at block 704 determines that the disk type does not match the port type, then at block 708 the port is configured as a bridging port on the local storage controller. A port configured as a bridging port causes data to be written to the port to be provided to a pass-thru stack. As described above, the pass-thru stack may perform protocol conversion (e.g., SAS to fibre channel), however the pass-thru stack omits value-added operations such as compression, deduplication, WAFL etc.

As will be appreciated by one skilled in the art, aspects of the inventive subject matter may be embodied as a system, method or computer program product. Accordingly, aspects of the inventive subject matter may take the form of entirely hardware, entirely software (including firmware, resident software, micro-code, etc.) or a combination of software and hardware aspects that may all generally be referred to herein as a "circuit," "module" or "system." Furthermore, aspects of the inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible non-transitory medium that can contain, or store a program for use by or in connection with an instruction execution system, apparatus, or device. A computer readable storage medium does not encompass a transitory propagating signal.

A computer readable signal medium may include a propagated data signal with computer readable program code embodied therein, for example, in baseband or as part of a carrier wave. Such a propagated signal may take any of a variety of forms, including, but not limited to, an electromagnetic signal, an optical signal, an infrared signal, or any suitable combination thereof. A computer readable signal medium may be any computer readable medium that is not a computer readable storage medium and that can communicate, propagate, or transport a program for use by or in connection with a computer. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the inventive subject matter may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone computer, may execute in a distributed manner across multiple computers, and may execute on one computer while providing results and or accepting input on another computer.

Aspects of the inventive subject matter are described with reference to flowchart illustrations and/or block diagrams of methods, apparatus (systems) and computer program products according to aspects of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Figure 8:
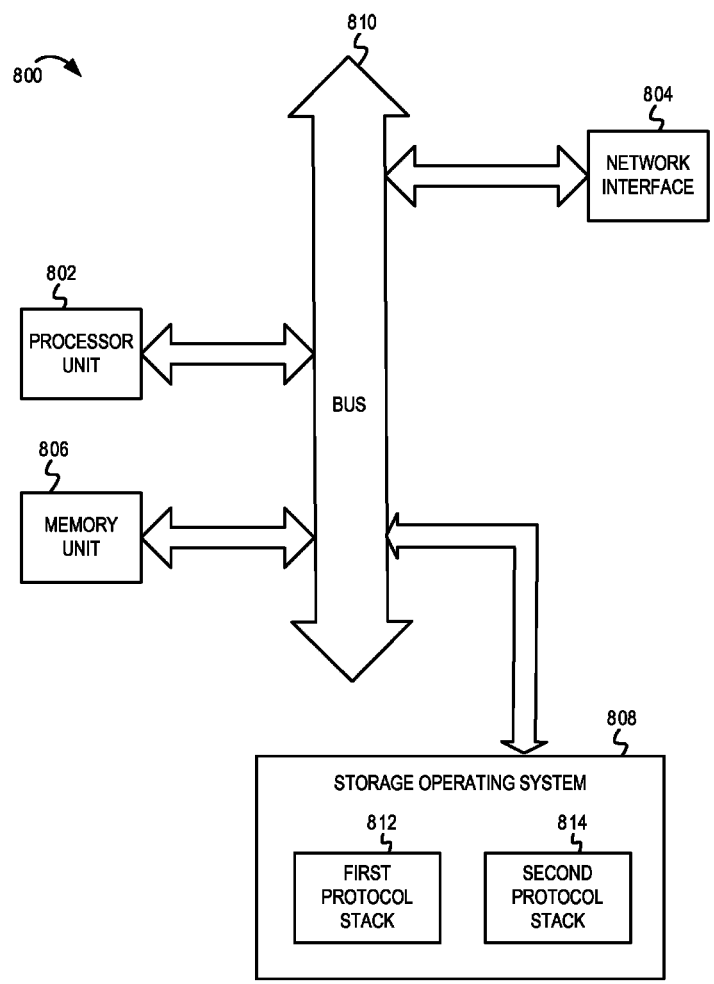
FIG. 8 illustrates an example computer environment.

FIG. 8 depicts an example storage controller system including a bridging function. A storage controller includes a processor 802 (possibly including multiple processors, multiple cores, multiple nodes, and/or implementing multithreading, etc.). The storage controller system includes memory 806. The memory 806 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 810 (e.g., PCI, ISA, PCI-Express, HyperTransport®, InfiniBand®, NuBus, etc.), a network interface 804 (e.g., an ATM interface, an Ethernet interface, a Frame Relay interface, SONET interface, wireless interface, etc.), and a storage operating system 808. The storage operating system 808 may include a first protocol stack 812 and a second protocol stack 814, where the first protocol stack provides value-added operations and the second protocol stack is a pass-thru stack. The functionality of the storage operating system 808 can be partially (or entirely) implemented in hardware and/or on the processor 802. For example, the functionality may be implemented with an application specific integrated circuit, in logic implemented in the processor 802, in a co-processor on a peripheral device or card, etc. Further, realizations may include fewer or additional components not illustrated in FIG. 8 (e.g., video cards, audio cards, additional network interfaces, peripheral devices, etc.). The processor 802 and the network interface 804 are coupled to the bus 810. Although illustrated as being coupled to the bus 810, the memory 806 may be coupled to the processor 802.

While the features of the disclosure are described with reference to various implementations and exploitations, it will be understood that these features are illustrative and that the scope of the inventive subject matter is not limited to them. In general, techniques for bridging first storage controller to a second storage controller as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    receiving, by a first storage controller, data from a host;
    providing the data to a storage stack, the storage stack performing at least one of a compression operation, a deduplication operation, and a file layout operation prior to writing the data to a first storage unit coupled to a first port of the first storage controller;
    determining, by the first storage controller, that a second port of the first storage controller is configured as a remote port of the first storage controller;
    in response to determining that the second port of the first storage controller is configured as the remote port of the first storage controller, providing the data to a pass-thru stack, the pass-thru stack performing protocol conversion on the data to create second data, and writing the second data to the second port of the first storage controller;
    responsive to receiving an indication of a presence of a disk on the second port of the first storage controller:
        determining if a disk type of the disk matches a port type of the second port; and
        in response to determining that the port type does not match the disk type, configuring the second port of the first storage controller as the remote port.

2. The method of claim 1, wherein the pass-thru stack does not perform the compression operation, the deduplication operation, and the file layout operation.

3. The method of claim 1, wherein the protocol conversion comprises converting between protocols including SAS, fibre channel, fibre channel over Ethernet, and ISCSI.

4. The method of claim 1, wherein the first port comprises a SAS port.

5. The method of claim 4, wherein the second port comprises a fibre channel port.

6. The method of claim 1, wherein the second data is received at a port of a second storage storage controller, and the method further comprising:
   determining whether the port of the second storage controller is configured as a second remote port on the second storage controller;
   in response to determining that the port is configured as the second remote port on the second storage controller, providing the second data to the pass-thru stack, the pass-thru stack performing protocol conversion to create third data, and writing the third data to a third port of the second storage controller; and
   in response to determining that the port is not configured as the remote port, providing the second data to the storage stack, wherein the storage stack performs at least one of the compression operation, the deduplication operation, or
   the file layout operation, and writing the second data to a second storage unit coupled to the third port of the second storage controller.

7. The method of claim 6, further comprising:
   receiving an indication of a presence of a second disk on the port of the second storage controller;
   determining if the second disk has been configured as a foreign disk; and
   in response to determining that the second disk has been configured as a foreign disk, configuring the port of the second storage controller as the remote port.

8. A non-transitory machine readable medium having stored thereon instructions for performing a method comprising machine executable code which when executed by at least one machine, causes the machine to:
   receive, by a first storage controller, data from a host;
   provide the data to a storage stack, the storage stack performing at least one of a compression operation, a deduplication operation, and a file layout operation prior to writing the data to a first storage unit coupled to a first port of the first storage controller;
   determine, by the first storage controller, whether a second port of the first storage controller is configured as a remote port of the first storage controller;
   in response to a determination that the second port of the first storage controller is configured as the remote port of the first storage controller, provide the data to a pass-thru stack, wherein the pass-thru stack performs protocol conversion on the data to create second data, and write the second data to the second port of the first storage controller;
   responsive to receiving an indication of a presence of a disk on a port of a second storage controller:
   determine if the disk has been configured as a foreign disk; and
   in response to a determination that the disk has been configured as a foreign disk, configure the port of the second storage controller as the remote port.

9. The non-transitory machine readable medium of claim 8, wherein the pass-thru stack does not perform the compression operation, the deduplication operation, and the file layout operation.

10. The non-transitory machine readable medium of claim 8, wherein the protocol conversion comprises conversion between protocols including SAS, fibre channel, fibre channel over Ethernet, and ISCSI.

11. The non-transitory machine readable medium of claim 8, wherein the first port comprises a SAS port and the second port comprises a fibre channel port.

12. The non-transitory machine readable medium of claim 8, wherein the machine executable code further causes the machine to:
   receive an indication of a presence of a second disk on the second port of the first storage controller;
   determine if a disk type of the second disk matches a port type of the second port; and
   in response to a determination that the port type does not match the disk type, configure the second port of the first storage controller as the remote port.

13. The non-transitory machine readable medium of claim 8, wherein the second data is received at the port of the second storage controller, and wherein the machine executable code further causes the machine to:
   determine whether the port of the second storage controller is configured as the remote port on the second storage controller; and
   in response to a determination that the port is configured as the remote port on the second storage controller, providing the second data to the pass-thru stack, the pass-thru stack performing protocol conversion to create third data, and writing the third data to a third port of the second storage controller.

14. The non-transitory machine readable medium of claim 13, wherein the machine executable code further causes the machine to:
   in response to a determination that the port is not configured as the remote port, providing the second data to the storage stack, wherein the storage stack performs at least one of the compression operation, the deduplication operation, or the file layout operation, and writing the second data to a second storage unit coupled to the third port of the second storage controller.

15. A computing device comprising:
   a first storage controller having a first port communicably coupled to a first storage unit, a second port and at least one processor, the first storage controller configured to:
   receive data from a host;
   determine, based at least in part on a disk type indicated on the second port, whether the second port of the first storage controller is configured as a remote port of the first storage controller;
   in response to a determination that the second port of the first storage controller is configured as the remote port of the first storage controller, provide the data to a storage stack and a pass-thru stack;
   wherein the storage stack performs at least one of a compression operation, a deduplication operation, and a file layout operation prior to writing the data to the first storage unit communicably coupled to the first port of the first storage controller; and
   wherein the pass-thru stack performs protocol conversion on the data to create second data, and writes the second data to the second port of the first storage controller;

responsive to receiving an indication of a presence of a disk on the second port of the first storage controller:
    determine if a disk type of the disk matches a port type of the second port; and
    in response to a determination that the port type does not match the disk type, configure the second port of the first storage controller as the remote port.

16. The computing device of claim 15, wherein the pass-thru stack does not perform the compression operation, the deduplication operation, and the file layout operation.

17. The computing device of claim 15, wherein the protocol conversion comprises conversion between protocols including SAS, fibre channel, fibre channel over Ethernet, and ISCSI.

18. The computing device of claim 15, wherein the first port comprises a SAS port.

19. The computing device of claim 15, wherein the second data is received at a port of a second storage controller, and wherein the first storage controller is further configured to:
    determine whether the port of the second storage controller is configured as the remote port on the second storage controller;
    in response to a determination that the port is configured as the remote port on the second storage controller, provide the second data to the pass-thru stack, the pass-thru stack performing protocol conversion to create third data, and writing the third data to a third port of the second storage controller; and
    in response to a determination that the port is not configured as the remote port, provide the second data to the storage stack, wherein the storage stack performs at least one of the compression operation, the deduplication operation, and the file layout operation, and writing the second data to a second storage unit coupled to the third port of the second storage controller.

20. The computing device of claim 15, wherein the second port comprises a fibre channel port.

* * * * *